(12) United States Patent
Suzuki et al.

(10) Patent No.: US 7,212,218 B2
(45) Date of Patent: May 1, 2007

(54) VIDEO DISPLAY APPARATUS AND VIDEO DISPLAY METHOD

(75) Inventors: Ryoji Suzuki, Nara (JP); Tetsuya Itani, Ikoma (JP); Ikuoh Nishida, Takarazuka (JP); Satoshi Kato, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 97 days.

(21) Appl. No.: 10/502,549

(22) PCT Filed: Dec. 1, 2003

(86) PCT No.: PCT/JP03/15313

§ 371 (c)(1), (2), (4) Date: Jul. 23, 2004

(87) PCT Pub. No.: WO2004/051992

PCT Pub. Date: Jun. 17, 2004

(65) Prior Publication Data

US 2005/0190202 A1    Sep. 1, 2005

(30) Foreign Application Priority Data

Nov. 29, 2002  (JP) ............................. 2002-348672

(51) Int. Cl.
  *G09G 5/00*  (2006.01)
  *G09G 5/10*  (2006.01)
  *H04N 7/01*  (2006.01)
  *H04N 5/46*  (2006.01)

(52) U.S. Cl. ...................... 345/660; 345/698; 348/445; 348/556

(58) Field of Classification Search ................ 348/445, 348/556; 345/660, 698
See application file for complete search history.

(56) References Cited

U.S. PATENT DOCUMENTS

| | | | | |
|---|---|---|---|---|
| 4,710,761 A | * | 12/1987 | Kapur et al. ................. | 715/790 |
| 5,136,398 A | * | 8/1992 | Rodriguez-Cavazos et al. .......................... | 348/445 |
| 5,249,049 A | * | 9/1993 | Kranawetter et al. ....... | 348/473 |
| 5,309,234 A | * | 5/1994 | Kranawetter et al. ....... | 348/473 |

(Continued)

FOREIGN PATENT DOCUMENTS

| | | |
|---|---|---|
| JP | 8-46809 A | 2/1996 |
| JP | 2001-8128 A | 1/2001 |

*Primary Examiner*—Ryan Yang
(74) *Attorney, Agent, or Firm*—Pearne & Gordon LLP

(57) ABSTRACT

When the combination of the image signal and contents each having various aspect ratios is displayed on the display with various aspect ratios, an image display device that generates a proper display screen with simple operation or automatically is provided. The image display device of the present invention has a display screen expanding part for expanding a display screen of input image signal in at least one direction of the horizontal direction and the vertical direction based on an expansion ratio; a selecting part for automatically setting the above-mentioned expansion ratio of the above-mentioned display screen expanding part in at least one direction of the horizontal direction and the vertical direction based on information on an aspect ratio of a display, information on an aspect ratio of an image signal, and information on an aspect ratio of contents as an effective section of the above-mentioned image signal; and the above-mentioned display for displaying the display screen of the above-mentioned image signal.

10 Claims, 8 Drawing Sheets

U.S. PATENT DOCUMENTS

| | | | |
|---|---|---|---|
| 5,384,600 A * | 1/1995 | Kaizaki et al. | 348/556 |
| 5,389,975 A * | 2/1995 | Maeshima et al. | 348/556 |
| 5,400,077 A * | 3/1995 | Cookson et al. | 348/556 |
| 5,461,431 A * | 10/1995 | Takebuchi et al. | 348/806 |
| 5,673,086 A * | 9/1997 | Fukuoka et al. | 348/445 |
| 5,712,689 A * | 1/1998 | Yasuki et al. | 348/561 |
| 5,836,872 A * | 11/1998 | Kenet et al. | 600/306 |
| 5,917,549 A * | 6/1999 | Simons et al. | 348/441 |
| 5,949,494 A * | 9/1999 | Yamagata et al. | 348/558 |
| 6,002,797 A * | 12/1999 | Mori et al. | 382/173 |
| 6,331,862 B1 * | 12/2001 | Yamada et al. | 345/660 |
| 6,636,266 B2 * | 10/2003 | Takahashi | 348/445 |
| 6,690,425 B1 * | 2/2004 | Worrell | 348/445 |
| 6,995,780 B1 * | 2/2006 | Yamada | 345/698 |

* cited by examiner

FIG. 9
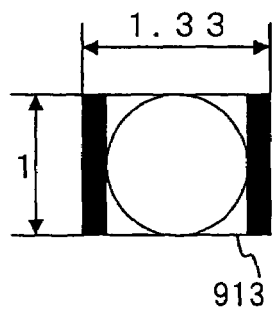
913
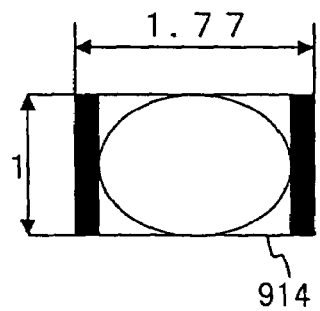
914
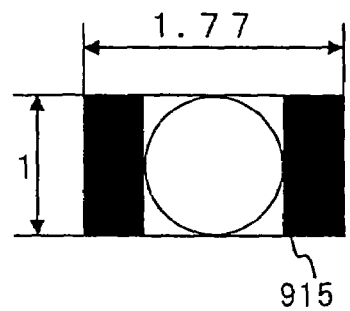
915
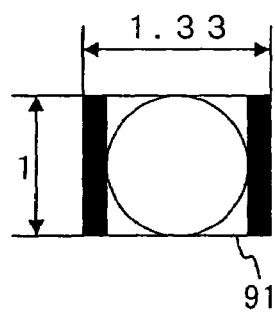
916
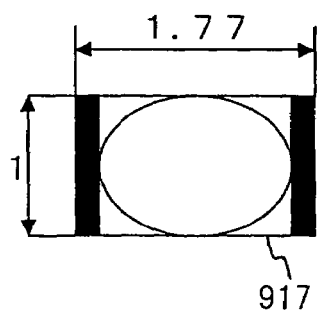
917
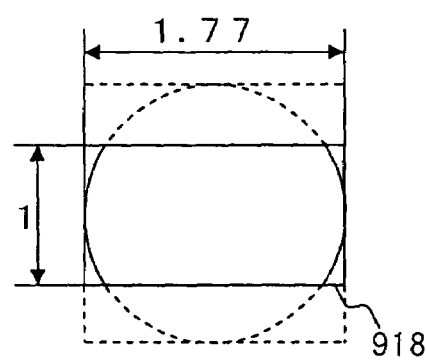
918
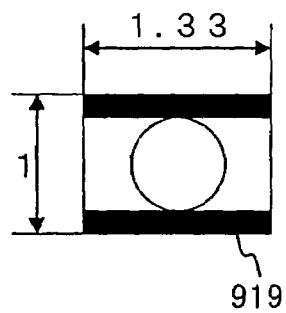
919
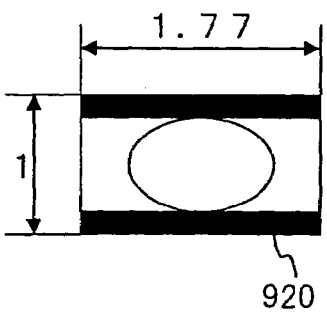
920
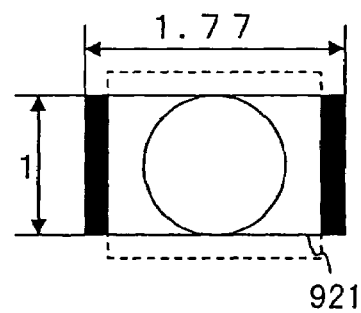
921
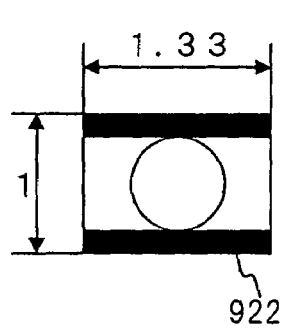
922
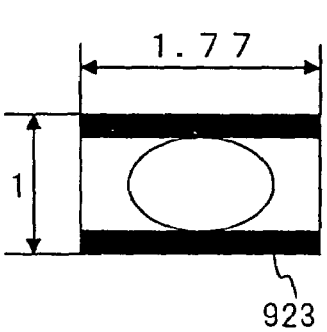
923
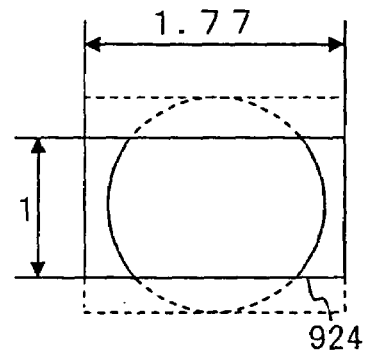
924

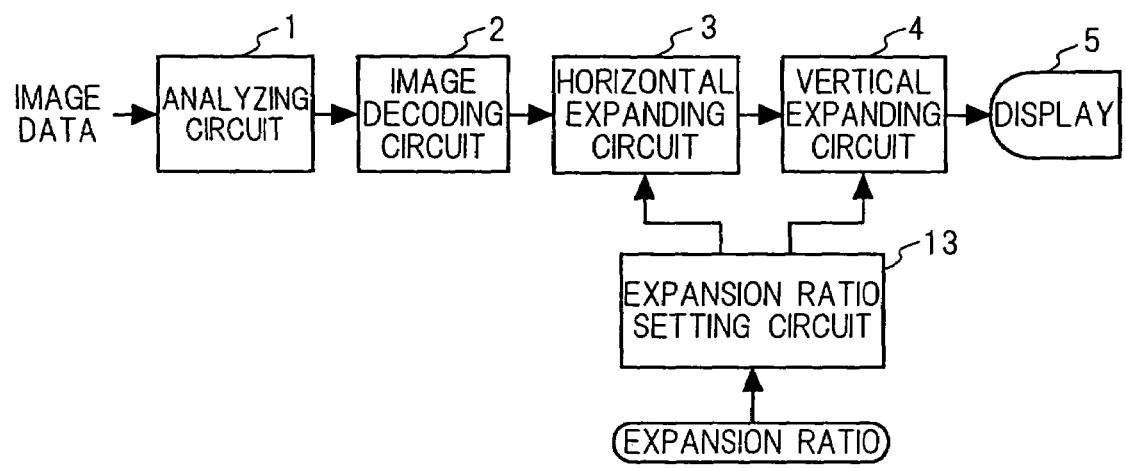
F I G. 1 0

VIDEO DISPLAY APPARATUS AND VIDEO DISPLAY METHOD

TECHNICAL FIELD

The present invention relates to an image display device and an image display method.

BACKGROUND ART

Recently, an image signal containing contents having various aspect ratios and having various aspect ratios has been broadcast on television and has been recorded in a recording medium for sale or rental. When the user watches and listens these contents with an image display device with various aspect ratios, the image display device is required to display a proper display screen by expanding the display screen of the image signal in the horizontal and vertical directions.

FIG. 10 is a block diagram of an image display device of a first conventional example. FIG. 10 shows an analyzing circuit 1, an image decoding circuit 2, a horizontal expanding circuit 3, a vertical expanding circuit 4, a display 5 and an expansion ratio setting circuit 13. The user sets proper horizontal expansion ratio and vertical expansion ratio in the expansion ratio setting circuit according to contents through an operation panel (not shown). The analyzing circuit 1 picks up only desired data from an input image stream. The image decoding circuit 2 decodes the image data picked up in the analyzing circuit 1 into an image signal. The horizontal expanding circuit 3 expands the image signal in the horizontal direction at the horizontal expansion ratio set by the user. The vertical expanding circuit 4 expands the image signal in the vertical direction at the vertical expansion ratio set by the user. The display 5 displays the image signal expanded at each of the horizontal expansion ratio and the vertical expansion ratio. For example, the user determines setting values of the horizontal expansion ratio and the vertical expansion ratio by trial and error so as to remove black zones produced at top and bottom sides or its left and right sides of the screen due to the difference among the aspect ratios of the display, image signal and contents.

Unexamined Patent Publication No. Hei 5-323944 discloses an image display device of a second conventional example. The image display device of the second conventional example intends to display an undistorted image at a correct pixel aspect ratio when image data having a different pixel aspect ratio from the pixel aspect ratio of the display of the image display device is displayed. Based on information on the pixel aspect ratio added to the image data, the image display device of the second conventional example converts the horizontal and vertical image display size by using the size converting means and displays the converted image. Here, the pixel aspect ratio means a ratio of height to width for each pixel represented by digital instead of a ratio of height to width of the whole screen.

However, it is extremely bothersome for the user to set the aspect ratio of the display screen of the image display device for each contents by trial and error. The user frequently forgets to set the aspect ratio or sets an incorrect aspect ratio, resulting in viewing a screen displayed at an improper aspect ratio.

More recently, various aspect ratios have appeared in each of the display, image signal and contents. For example, the aspect ratios of vertical to horizontal size for display are 1:1.33 (=3:4) and 1:1.77 (9:16), the aspect ratios of vertical to horizontal size for image signal are 1:1.33 (=3:4) and 1:1.77 (9:16), and the aspect ratios of vertical to horizontal size for contents are typically 1:1.33 (=3:4), 1:1.66 (European vista) and 1:2.35 (cinema scope). Depending on combination of these aspect ratios, black zones with various widths appear at the top and bottom sides or the left and right sides of the display screen.

When the aspect ratios of the image data, contents and display are the same, the image reproducing device of the second conventional example displays the image data without generating black zones at the top and bottom sides or the left and right sides of the display screen. When the requirement is not satisfied, however, black zones occur at the top and bottom sides or the left and right sides of the display screen. The image reproducing device of the second conventional example lacks the concept of displaying the screen based on the contents aspect ratio.

An object of the present invention is to provide an image display device and an image display method that generate a proper display screen, with a simple operation or automatically, when a combination of an image signal and contents each having various aspect ratios is displayed on a display with various aspect ratios.

An object of the present invention is to provide an image display device and an image display method that generate a display screen that does not cause distortion due to the difference between the image signal aspect ratio and the display aspect ratio with simple operation or automatically without generating black zones at its top and bottom sides or its left and right sides in most cases when a combination of an image signal and contents each having various aspect ratios is displayed on a display with various aspect ratios.

DISCLOSURE OF THE INVENTION

In order to these problems, an image display device from one aspect of the present invention has a display screen expanding part for expanding a display screen of input image signal in at least one direction of the horizontal direction and the vertical direction based on an expansion ratio; a selecting part for automatically setting the above-mentioned expansion ratio of the above-mentioned display screen expanding part in at least one direction of the horizontal direction and the vertical direction based on information on an aspect ratio of a display, information on an aspect ratio of an image signal, and information on an aspect ratio of contents as an effective section of the above-mentioned image signal; and the above-mentioned display for displaying the display screen of the above-mentioned image signal.

The present invention has an effect of realizing the image display device and image display method that can generate a proper display screen with simple operation or automatically, when the combination of the image signal and contents each having various aspect ratios is displayed on the display with various aspect ratios.

The novel features of the invention are set forth with particularity in the appended claims. The invention as to both structure and content, and other objects and features thereof will best be understood from the detailed description when considered in connection with the accompanying drawings.

BRIEF DESCRIPTION OF THE DRAWINGS

FIG. 9 is a view showing display screens of a display in combinations of display aspect ratio (1:1.77), image signal aspect ratio (1:1.33) and various contents aspect ratios.

FIG. 10 is a block diagram of a conventional image display device.

Figure 1:
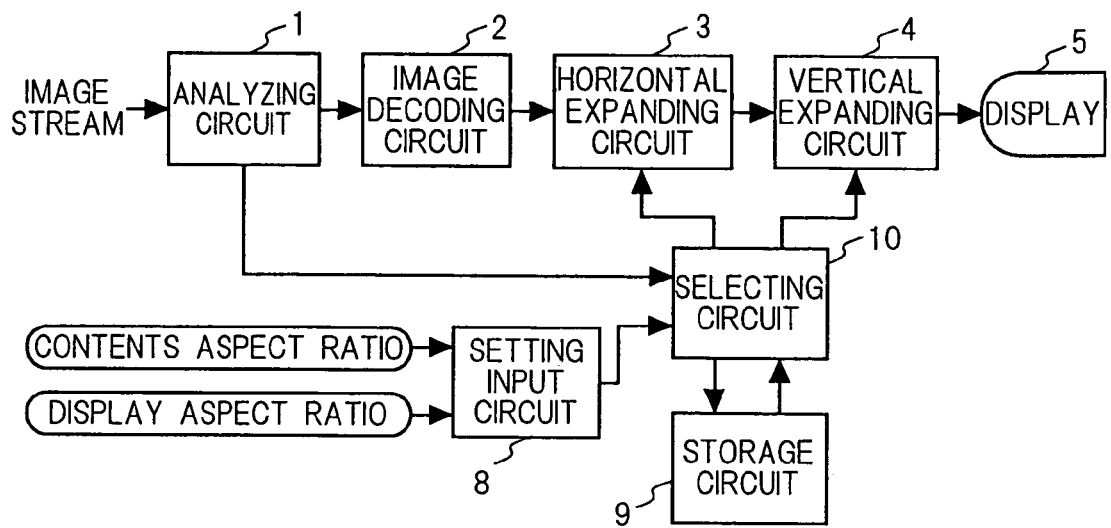
FIG. 1 is a block diagram of an image display device in accordance with a first embodiment of the present invention.

Part or All of the drawings are drawn schematically for diagrammatic representation and it should be considered that they do not necessarily reflect relative size and position of components shown therein.

BEST MODE FOR CARRYING OUT THE INVENTION

An image display device from one aspect of the present invention has a display screen expanding part for expanding a display screen of input image signal in at least one direction of the horizontal direction and the vertical direction based on an expansion ratio; a selecting part for automatically setting the above-mentioned expansion ratio of the above-mentioned display screen expanding part in at least one direction of the horizontal direction and the vertical direction based on information on an aspect ratio of a display, information on an aspect ratio of an image signal, and information on an aspect ratio of contents as an effective section of the above-mentioned image signal; and the above-mentioned display for displaying the display screen of the above-mentioned image signal.

Information on each aspect ratio may be input manually or may be derived automatically. Conventionally, the user has acquired optimum horizontal expansion ratio and vertical expansion ratio based on information on an aspect ratio of a display, information on an aspect ratio of an image signal, and information on an aspect ratio of contents as an effective section of the above-mentioned image signal while viewing the display screen by trial and error. The image display device of the present invention determines the horizontal expansion ratio and the vertical expansion ratio by merely inputting information three or less (in the case where one or two aspect ratios are derived automatically) aspect ratios or automatically (in the case where the three aspect ratios are derived automatically) and displays an optimum display screen.

An image display device from another aspect of the present invention has a horizontal expanding part for expanding a display screen of an input image signal according to a horizontal expansion ratio; a vertical expanding part for expanding a display screen of the image signal according to a vertical expansion ratio; a selecting part for automatically setting the above-mentioned horizontal expansion ratio and the above-mentioned vertical expansion ratio based on information on an aspect ratio of a display, information on an aspect ratio of the image signal, and information on an aspect ratio of contents as an effective section of the above-mentioned image signal; and the above-mentioned display for displaying the display screen of the above-mentioned image signal. The "expansion ratio" includes a value less than 1 (contraction).

In the above-mentioned image display device from another aspect of the present invention, the above-mentioned selecting part has a table or function for deriving the above-mentioned expansion ratio using information on an aspect ratio of a display, information on an aspect ratio of an image signal, and information on an aspect ratio of contents as parameters and derives and sets the above-mentioned expansion ratio based on the above-mentioned table or function.

The above-mentioned image display device from another aspect of the present invention further has a contents aspect ratio detecting part for detecting position and width of black zones of the display screen at the top and bottom sides or left and right sides from the above-mentioned image signal, calculating a contents aspect ratio as an aspect ratio of the screen except for the above-mentioned black zones based on the position and width of the above-mentioned black zones, and outputting the calculated result to the selecting part.

The "black zone" means a zonal region of non-signal or black level (for example, APL of 0% or less), or a zonal region does not include non-signal, or at least base band component of the image signal independently of displayed contents in an original effective period of the image signal. Typically, the black zone refers to the region of black level.

In an image display device from another aspect of the present invention, provided that the vertical: horizontal aspect ratio of the display is 1:a, the vertical: horizontal aspect ratio of the image signal is 1:b, and the vertical: horizontal aspect ratio of the contents is 1:c, the above-mentioned selecting part sets c/a as a horizontal expansion ratio and c/b as a vertical expansion ratio in the case of $b \leq a \leq c$, sets b/a as a horizontal expansion ratio and 1 as a vertical expansion ratio, or sets b/c as a horizontal expansion ratio and a/c as a vertical expansion ratio in the case of $c \leq b \leq a$, and sets c/a as a horizontal expansion ratio and c/b as a vertical expansion ratio, or sets 1 as a horizontal expansion ratio and a/b as a vertical expansion ratio in the case of $b \leq c \leq a$.

When the combination of the image signal and contents each having various aspect ratios is displayed on the display with various aspect ratios, the present invention has the effect of realizing the image display device and image display method that cause no distortion due to the difference between the image signal aspect ratio and the display aspect ratio without generating black zones at its top and bottom sides or its left and right sides in most cases.

It is also possible to mathematically acquire the horizontal expansion ratio and vertical expansion ratio that do not generate black zones and distortion based the contents aspect ratio and the display aspect ratio. However, when a uniform calculating method is applied to all combinations of the three kinds of aspect ratios, the problem arises that most of the image signal is cut, thereby to fail to disclose a critical part of the image signal depending on the combination of the three kinds of aspect ratios. By acquiring the horizontal expansion ratio and vertical expansion ratio according to the above-mentioned setting of conditions and formulas, a practical image display device that generates a proper display screen that does not cause distortion due to the difference between the image signal aspect ratio and the display aspect ratio without generating black zones at its top and bottom sides or its left and right sides in most cases while leaving the critical part of the image signal can be realized.

An image display method from another aspect of the present invention has a selecting step of automatically setting an expansion ratio of a display screen in at least one direction of the horizontal direction and the vertical direction based on information on an aspect ratio of a display, information on an aspect ratio of an input image signal, and information on an aspect ratio of contents as an effective section of the above-mentioned image signal; a display screen expanding step of expanding the display screen of the above-mentioned image signal in at least one direction of the horizontal direction and the vertical direction based on the above-mentioned expansion ratio; and a displaying step of displaying the display screen of the above-mentioned image signal.

An image display method from another aspect of the present invention further has a selecting step of automatically setting a horizontal expansion ratio and a vertical expansion ratio based on information on an aspect ratio of a display, information on an aspect ratio of an input image signal, and information on an aspect ratio of contents as an effective section of the above-mentioned image signal; a horizontal expanding step of expanding the display screen of the above-mentioned image signal in the horizontal direction according to the above-mentioned horizontal expansion ratio; a vertical expanding step of expanding the display screen of the above-mentioned image signal in the vertical direction according to the above-mentioned vertical expansion ratio; and a displaying step of displaying the display screen of the above-mentioned image signal.

In the above-mentioned image display method from another aspect of the present invention, in the above-mentioned selecting step, the above-mentioned expansion ratio is derived and set based on a table or function for deriving the above-mentioned expansion ratio using information on an aspect ratio of the display, information on an aspect ratio of the image signal, and information on an aspect ratio of contents as parameters.

The above-mentioned image display method further has a contents aspect ratio detecting step of detecting position and width of black zones of the display screen at the top and bottom sides or left and right sides from the above-mentioned image signal, calculating a contents aspect ratio as an aspect ratio of the screen except for the above-mentioned black zones based on the position and width of the above-mentioned black zones, and outputting the calculated result to the selecting part.

In the above-mentioned image display method from another aspect of the present invention, provided that the vertical: horizontal aspect ratio of the display is 1:a, the vertical: horizontal aspect ratio of the image signal is 1:b, and the vertical: horizontal aspect ratio of the contents is 1:c, in the above-mentioned selecting step, c/a and c/b are set as a horizontal expansion ratio and a vertical expansion ratio, respectively, in the case of $b \leq a \leq c$, b/a and 1 are set as a horizontal expansion ratio and as a vertical expansion ratio, respectively, or b/c and a/c are set as a horizontal expansion ratio and a/c as a vertical expansion ratio, respectively, in the case of $c \leq b \leq a$, and c/a and c/b are set as a horizontal expansion ratio and as a vertical expansion ratio, respectively, or 1 and a/b are set as a horizontal expansion ratio and as a vertical expansion ratio, respectively, in the case of $b \leq c \leq a$.

Embodiments of the present invention will be described with reference to FIG. 1 to FIG. 8 below.

<<First Embodiment>>

Referring to FIG. 1, an image display device in accordance with a first embodiment of the present invention will be described. FIG. 1 is a block diagram of the image display device in accordance with the first embodiment of the present invention. FIG. 1 shows an analyzing circuit 1 for extracting image data and an image signal aspect ratio from an image stream and outputting them, an image decoding circuit 2 for decoding the image data output from the analyzing circuit 1 and outputting an image signal, a horizontal expanding circuit 3 for expanding the image signal in the horizontal direction, a vertical expanding circuit 4 for expanding the image signal in the vertical direction, a display 5 for displaying the image signal, a setting input circuit 8 for inputting a contents aspect ratio and a display aspect ratio from outside, a storage circuit 9 for storing a table of horizontal expansion ratio and vertical expansion ratio and a selecting circuit 10.

The storage circuit 9 stores the table of determining the horizontal expansion ratio and the vertical expansion ratio by using the display aspect ratio, image signal aspect ratio and contents aspect ratio (hereinafter referred to as "three kinds of aspect ratios") as parameters. The storage circuit 9 stores the horizontal expansion ratio and the vertical expansion ratio suitable for the combination of the three kinds of aspect ratios at an address set by these aspect ratios therein. Based on information on the display aspect ratio and the contents aspect ratio input to setting input circuit 8 and information on the image signal aspect ratio extracted in the analyzing circuit 1, the selecting circuit 10 reads desired horizontal expansion ratio and vertical expansion ratio from the storage circuit 9, sets the horizontal expansion ratio at the horizontal expanding circuit 3 and sets the at the vertical expanding circuit 4. In the case where the image display device has the fixed display 5, the image display device may store the aspect ratio of the display 5 in a nonvolatile memory.

The horizontal expansion ratio and the vertical expansion ratio stored in the table of the storage circuit 9 are values obtained by calculation in a sixth embodiment described later. The table stored in the storage circuit 9 has the horizontal expansion ratio and the vertical expansion ratio so that the display 5 can display the display screen that causes no distortion due to the difference between the image signal aspect ratio and the display aspect ratio without generating black zones at its top and bottom sides or its left and right sides in most cases (caused by difference among three kinds of aspect ratios).

Operation of the image display device in accordance with the first embodiment will be described below. The analyzing circuit 1 extracts image data and an image data aspect ratio from the input image stream, outputs the image data to the image decoding circuit 2 and outputs information on the image signal aspect ratio to the selecting circuit 10. Next, the image decoding circuit 2 decodes the image data output from the analyzing circuit 1 and outputs the image signal to the horizontal expanding circuit 3. The horizontal expanding circuit 3 expands the image signal output from the image decoding circuit 2 in the horizontal direction according to the horizontal expansion ratio output from the selecting circuit 10 and outputs the image signal expanded in the horizontal direction to the vertical expanding circuit 4. The vertical expanding circuit 4 expands the horizontally expanded image signal output from the horizontal expanding circuit 3 in the vertical direction according to the vertical expansion ratio output from the selecting circuit 10 and outputs the image signal expanded in the horizontal and vertical directions to the display 5. The display 5 displays the image signal expanded in the horizontal and vertical directions.

The setting input circuit 8 receives inputs of the contents aspect ratio and the display aspect ratio from outside and outputs them to the selecting circuit 10. The table stored in the storage circuit 9 stores the proper horizontal expansion ratio and vertical expansion ratio (in this embodiment, the horizontal expansion ratio and the vertical expansion ratio such that the display 5 can display the display screen that causes no distortion due to the difference between the image signal aspect ratio and the display aspect ratio without generating black zones at its top and bottom sides or its left and right sides in most cases) at the address set by three kinds of aspect ratios therein. Based on information on the display aspect ratio and the contents aspect ratio input to setting input circuit 8 and information on the image signal aspect ratio extracted in the analyzing circuit 1, the selecting circuit 10 reads desired horizontal expansion ratio and vertical expansion ratio from the storage circuit 9, sets the horizontal expansion ratio at the horizontal expanding circuit 3 and sets the vertical expansion ratio at the vertical expanding circuit 4.

As described above, based on information on each aspect ratio of the display 5, image signal and contents, respectively, the selecting circuit 10 reads the desired horizontal expansion ratio and vertical expansion ratio from the storage circuit 9, sets the horizontal expansion ratio at the horizontal expanding circuit 3 and sets the vertical expansion ratio at the vertical expanding circuit 4, thereby that the user can view a proper display screen on the display 5 with simple operation.

While information on the image signal aspect ratio is extracted from the image data by the analyzing circuit 1 and the display aspect ratio can be determined by the connected display 6, the contents aspect ratio varies depending on the input image data. The display aspect ratio and the image signal aspect ratio are virtually limited to a small number of kinds (i.e. 4:3 and 16:9). It is possible to limit the remaining contents aspect ratio to typical ones and store a table (small table) of the horizontal expansion ratio and the vertical expansion ratio corresponding to the actually used display aspect ratios and the image signal aspect ratios and typical contents aspect ratios in the storage circuit 9. For example, the user may select arbitrary horizontal expansion ratio and vertical expansion ratio from the limited small table. In this case, parameters of the three kinds of aspect ratios are useful information for the user to select the horizontal expansion ratio and the vertical expansion ratio. Accordingly, the user can select proper expansion ratios that generate no black zones from typical expansion ratios without calculating the proper horizontal expansion ratio and vertical expansion ratio, while viewing the image signal output to the display 5.

Further, the selected contents aspect ratio (such as 1:1.85) or its common name (such as American vista) may be displayed on the screen. As a result, when the user knows the contents aspect ratio, the user can select arbitrary horizontal expansion ratio and vertical expansion ratio while checking whether or not the user's known contents aspect ratio corresponds to the selected contents aspect ratio, thereby to select proper horizontal expansion ratio and vertical expansion ratio that generate no black zones more easily and accurately.

<<Second Embodiment>>

Figure 2:
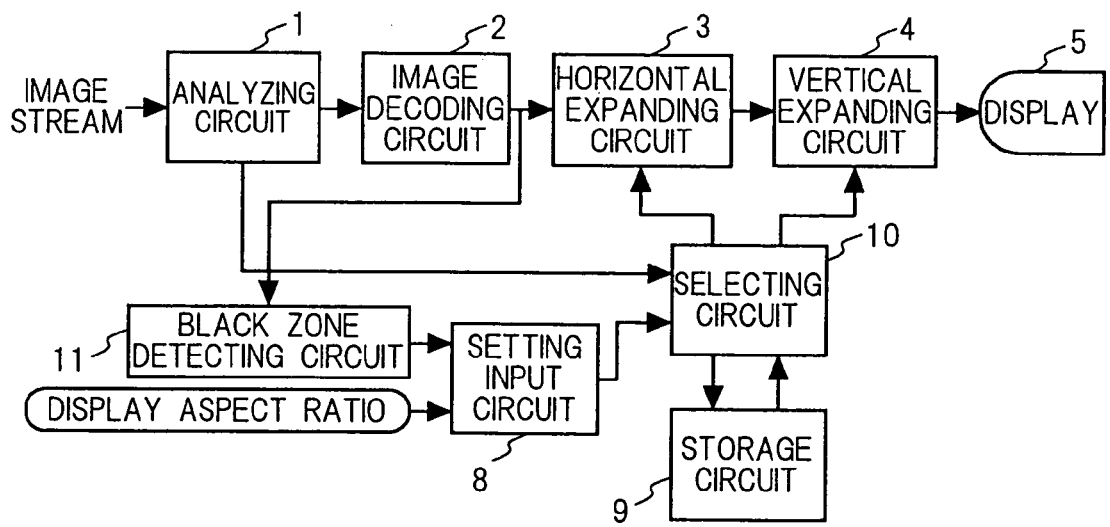
FIG. 2 is a block diagram of an image display device in accordance with a second embodiment of the present invention.

Referring to FIG. 2, an image display device in accordance with a second embodiment of the present invention will be described. FIG. 2 is a block diagram of the image display device in accordance with the second embodiment of the present invention. In the first embodiment (FIG. 1), the contents aspect ratio is set at the setting input circuit 8 from outside. Alternatively, the image display device in accordance with the second embodiment (FIG. 2) has a black zone detecting circuit 11 and the black zone detecting circuit 11 measures the width of black zones existing at the top and bottom sides or the left and right sides of the image signal output from the image decoding circuit 2, estimates the contents aspect ratio on the basis of the position and width of black zones and sets the estimated contents aspect ratio at the setting input circuit 8 automatically. The second embodiment is identical to the first embodiment except for this respect.

In the image display device in accordance with the second embodiment, the black zone detecting circuit 11 estimates the contents aspect ratio from the image signal output from the image decoding circuit 2 and the analyzing circuit 1 extracts the image signal aspect ratio from an image stream. In the image display device in accordance with the second embodiment, by setting only the display aspect ratio from outside, the selecting circuit 10 can determine parameters (three kinds of aspect ratios) of the storage circuit 9 and determine the optimum horizontal expansion ratio and vertical expansion ratio. In the image display device in accordance with the second embodiment, the display 5 displays the properly expanded screen (in this embodiment, the optimum expanded screen that causes no distortion due to the difference between the image signal aspect ratio and the display aspect ratio without generating black zones at its top and bottom sides or its left and right sides in most cases) with simpler operation. In the case where the image display device in accordance with the second embodiment has the fixed display 5, the image display device can determine the proper horizontal expansion ratio and vertical expansion ratio automatically by storing the display aspect ratio in a nonvolatile memory or the like.

The black zone detecting circuit 11 receives an input of the image signal output from the image decoding circuit 2 and measures brightness level (brightness information) by one horizontal line from the top of the screen of the image signal sequentially. The horizontal line that brightness level falls below a threshold (for example 10APL) in the whole horizontal section is defined as a black signal. The black zone detecting circuit 11 decides that a group of lines (upper black zone width) determined as the black signal contiguously from the top of the screen is not contained in contents. The black zone detecting circuit 11 estimates the upper black zone width based on the number of lines determined as the black signal contiguously from the top of the screen. The black zone detecting circuit 11 decides that a group of lines (lower black zone width) determined as the black signal contiguously from the bottom of the screen (up to the bottom contiguously) is not contained in contents. The black zone detecting circuit 11 estimates the lower black zone width based on the number of lines determined as the black signal contiguously from the bottom of the screen. The black zone detecting circuit 11 obtains the vertical aspect of contents by subtracting the upper black zone width and the lower black zone width from the number of all effective lines of the image signal.

The black zone detecting circuit 11 detects each section in which brightness level of the image signal output from the image decoding circuit 2 falls below a threshold from the respective left and right ends of each horizontal line contiguously. The black zone detecting circuit 11 defines a maximum value of the section in which brightness level falls below the threshold from the left end contiguously in all horizontal lines as a left black zone width and decides that the left black zone is not contained in contents. The black zone detecting circuit 11 defines a maximum value of the section in which brightness level falls below the threshold from the right end contiguously (up to the right end contiguously) in all horizontal lines as a right black zone width and decides that the right black zone is not contained in contents. The black zone detecting circuit 11 obtains the horizontal aspect of contents by subtracting the left black zone width and the right black zone width from of all effective horizontal section of the image signal.

The black zone detecting circuit 11 obtains the contents aspect ratio based on the vertical aspect and the horizontal aspect of the contents.

Only when the upper black zone width, lower black zone width, left black zone width and right black zone width are measured over plural screens (plural fields or plural frames) and the same results are obtained, the black zone detecting circuit 11 may calculates and outputs the contents aspect ratio based on the upper black zone width, lower black zone width, left black zone width and right black zone. Alternatively, the black zone detecting circuit 11 may measure the upper black zone width, lower black zone width, left black zone width and right black zone width over plural screens (plural fields or plural frames), define the respective minimum values derived from each of the plural screens as the upper black zone width, lower black zone width, left black zone width and right black zone width of the contents, calculate the contents aspect ratio based on these values and output it.

<<Third Embodiment>>

Figure 3:
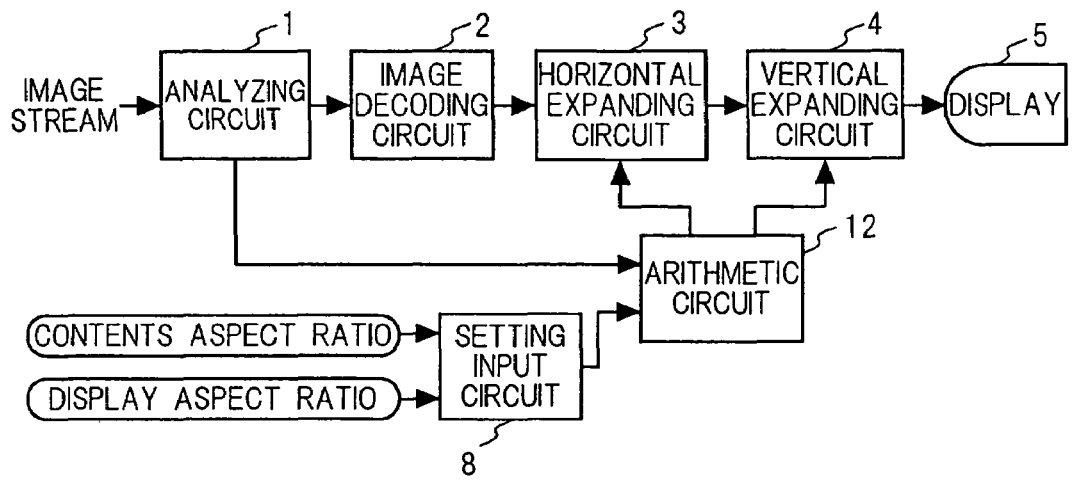
FIG. 3 is a block diagram of an image display device in accordance with a third embodiment of the present invention.

Referring to FIG. 3, an image display device in accordance with a third embodiment of the present invention will be described. FIG. 3 is a block diagram of the image display device in accordance with the third embodiment of the present invention. In FIG. 1 (first embodiment), based on information on each aspect ratio of the display 5, image signal and contents, the selecting circuit 10 reads desired horizontal expansion ratio and vertical expansion ratio from the table of the storage circuit 9, sets the horizontal expansion ratio at the horizontal expanding circuit 3 and sets the vertical expansion ratio at the vertical expanding circuit 4. Alternatively, the image display device in accordance with the third embodiment (FIG. 3) has an arithmetic circuit 12 (selecting part having a function) and based on the each aspect ratio of the display 5, image signal and contents, the arithmetic circuit 12 obtains proper horizontal expansion ratio and vertical expansion ratio (in this embodiment, the horizontal expansion ratio and the vertical expansion ratio that cause no distortion due to the difference between the image signal aspect ratio and the display aspect ratio without generating black zones at its top and bottom sides or its left and right sides in most cases) by calculation, sets the horizontal expansion ratio at the horizontal expanding circuit 3 and sets the vertical expansion ratio at the vertical expanding circuit 4. The third embodiment is identical the first embodiment except for this aspect.

In the image display device of FIG. 3, as the arithmetic circuit 12 obtains the proper horizontal expansion ratio and vertical expansion ratio by calculation based on information on the three kinds of aspect ratios, various combinations of the three kinds of aspect ratios can be addressed flexibly so that the display displays a proper screen (in this embodiment, the optimum screen that causes no distortion due to the difference between the image signal aspect ratio and the display aspect ratio without generating black zones at its top and bottom sides or its left and right sides in most cases).

While information on the image signal aspect ratio is extracted from the image stream by the analyzing circuit 1 and the display aspect ratio is determined by the connected display 6, the contents aspect ratio varies depending on the input image data. The display aspect ratio and the image signal aspect ratio are virtually limited to a small number of kinds (i.e. 4:3 and 16:9). It is possible to limit the remaining contents aspect ratio to typical ones and store typical contents aspect ratios in a nonvolatile memory or the like. For example, the user may select an arbitrary contents aspect ratio from the limited small table. In this case, parameters of the three kinds of aspect ratios are useful information for the user to select the horizontal expansion ratio and the vertical expansion ratio. In the image display device in accordance with the third embodiment, by merely setting the display aspect ratio from outside and selecting the contents aspect ratio from the typical aspect ratios, the arithmetic circuit 12 can determine the proper horizontal expansion ratio and vertical expansion ratio based on the function using the three kinds of aspect ratios as parameters. Accordingly, the user can select the proper contents aspect ratio that generates no black zones from the typical contents aspect ratios without calculating the proper horizontal expansion ratio and vertical expansion ratio while viewing the image signal output to the display 5.

Further, the selected contents aspect ratio (such as 1:1.85) or its common name (such as American vista) may be displayed on the screen. As a result, when the user knows the contents aspect ratio, in selecting arbitrary horizontal expansion ratio and vertical expansion ratio, the user can select arbitrary horizontal expansion ratio and vertical expansion ratio while checking whether or not the user's known contents aspect ratio corresponds to the selected contents aspect ratio, thereby to select the proper horizontal expansion ratio and vertical expansion ratio that generate no black zones more easily and accurately.

<<Fourth Embodiment>>

Figure 4:
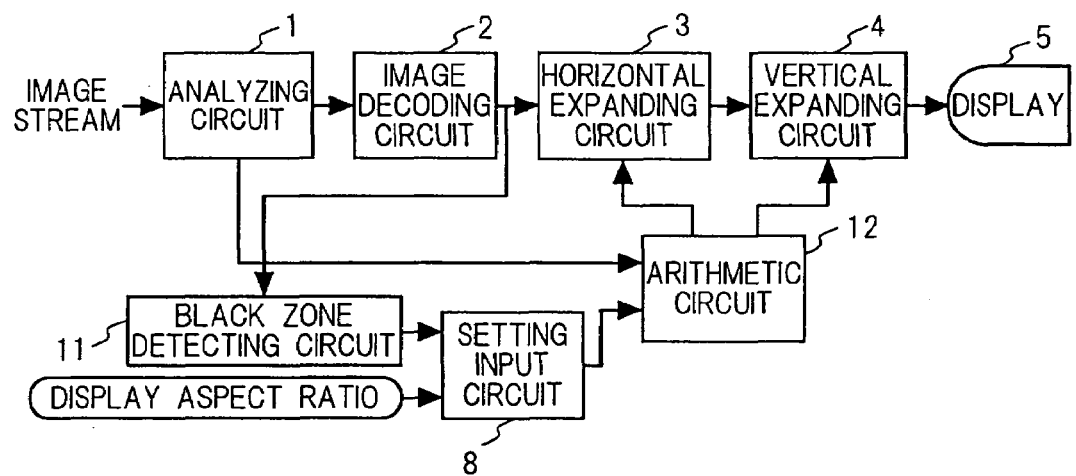
FIG. 4 is a block diagram of an image display device in accordance with a fourth embodiment of the present invention.

Referring to FIG. 4, an image display device in accordance with a fourth embodiment of the present invention will be described. FIG. 4 is a block diagram of the image display device in accordance with the fourth embodiment of the present invention. In FIG. 3 (third embodiment), the contents aspect ratio is input to the setting input circuit 8 from outside. Alternatively, the image display device in accordance with the fourth embodiment has a black zone detecting circuit 11 and the black zone detecting circuit 11 measures the black zone width existing at the top and bottom sides or the left and right sides of the image signal output from the image decoding circuit 2, estimates the contents aspect ratio on the basis of the position and width of black zones and sets the estimated contents aspect ratio at the setting input circuit 8 automatically. The fourth embodiment is identical the third embodiment except for this aspect.

In the image display device in accordance with the fourth embodiment, the black zone detecting circuit 11 estimates the contents aspect ratio from the image signal output from the image decoding circuit 2 and the analyzing circuit 1 extracts the image signal aspect ratio from the image stream. In the image display device in accordance with the fourth embodiment, by setting only the display aspect ratio from outside, the arithmetic circuit 12 can determine the optimum horizontal expansion ratio and vertical expansion ratio based on the function using the three kinds of aspect ratios as parameters. The image display device in accordance with the fourth embodiment displays the properly expanded screen (in this embodiment, the optimum expanded screen that causes no distortion due to the difference between the image signal aspect ratio and the display aspect ratio without generating black zones at its top and bottom sides or its left and right sides in most cases) with simpler operation. In the case where the image display device in accordance with the fourth embodiment has the fixed display 5, the image display device determines the proper horizontal expansion ratio and vertical expansion ratio automatically by storing the display aspect ratio in a nonvolatile memory or the like.

<<Fifth Embodiment>>

Figure 5:
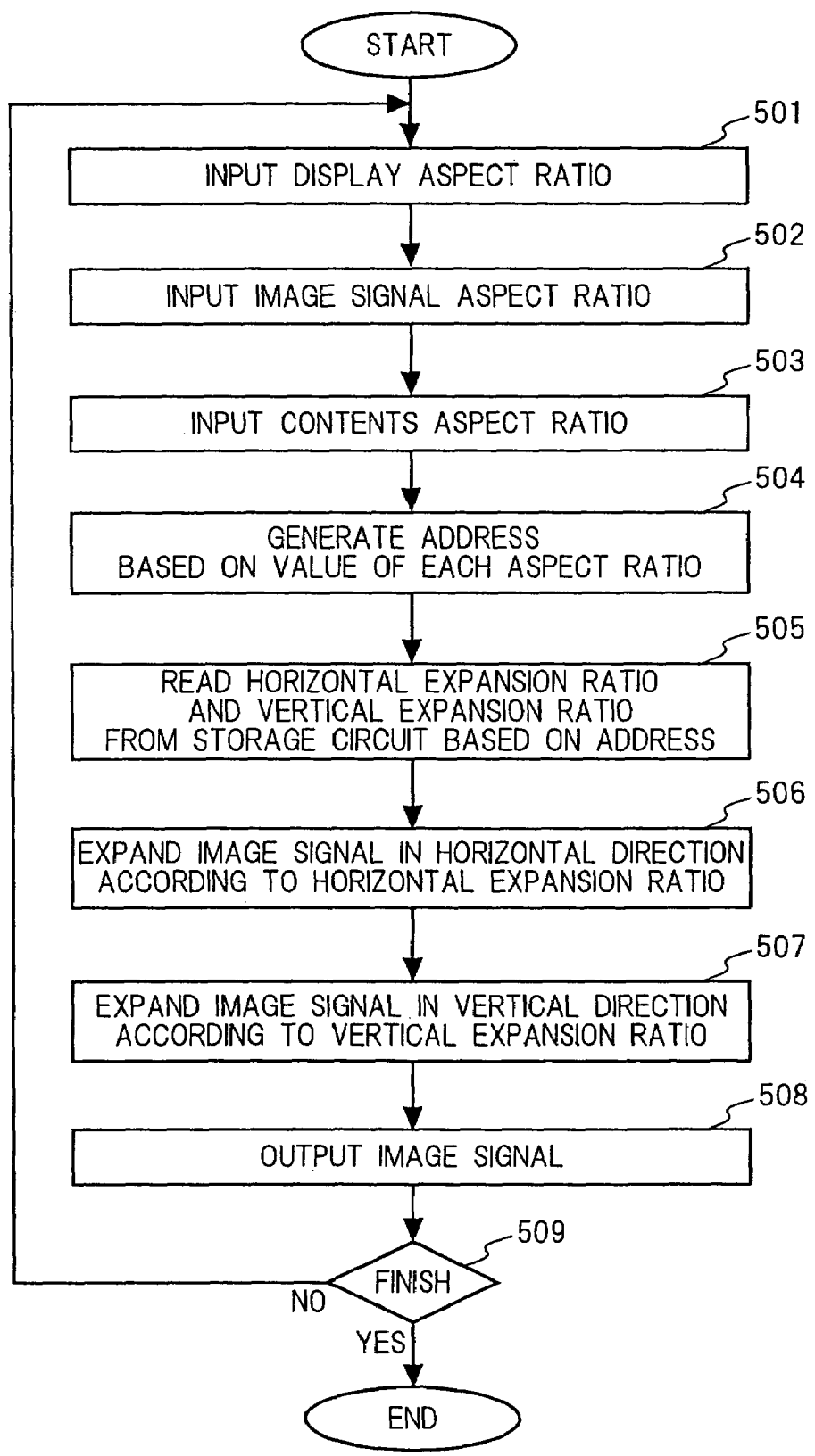
FIG. 5 is a flow chart of an image display method in accordance with a fifth embodiment of the present invention.

Referring to FIG. 5, an image display method in accordance with a fifth embodiment of the present invention will be described. The image display method in accordance with the fifth embodiment is performed by using the image display device in accordance with the first or second embodiment. FIG. 5 is a flow chart of the image display method in accordance with the fifth embodiment. In FIG. 5, firstly at a step 501, the selecting circuit 10 receives an input of the display aspect ratio (1:a). At a step 502, the analyzing circuit 1 extracts the image signal aspect ratio (1:b) from the image stream. At a step 503, the selecting circuit 10 receives an input of the contents aspect ratio (1:c). The contents aspect ratio is input though the setting input circuit 8 by the user or estimated automatically by the black zone detecting circuit 11.

At a step 504, an address of the table of the storage circuit 9 is generated based on the value of each aspect ratio input at the steps 501 to 503. At a step 505, the selecting circuit 10 reads the horizontal expansion ratio and the vertical expansion ratio from the storage circuit 9 on the basis of the address. At a step 506, the horizontal expanding circuit 3 expands the image signal in the horizontal direction according to the horizontal expansion ratio. At a step 507, the vertical expanding circuit 4 expands the image signal in the vertical direction according to the vertical expansion ratio. At a step 508, the display 5 outputs the image signal expanded horizontally and vertically. At a step 509, when display is finished, the operation is finished. At the step 509, when display is not finished, the operation proceeds to the step 501 and processing at the steps 501 to 509 is repeated.

Through the above-mentioned processing, the user can view the proper display screen on the display 5 with simple operation or automatically.

When the display device has the black zone detecting circuit 11, the black zone detecting circuit 11 estimates the contents aspect ratio from the image signal output from the image decoding circuit 2 and the analyzing circuit 1 extracts the image signal aspect ratio from the image stream. In this case, by setting only the display aspect ratio from outside, the selecting circuit 10 can determine parameters (three kinds of aspect ratios) of the storage circuit 9 and determine the optimum horizontal expansion ratio and vertical expansion ratio. In the image display device in accordance with this embodiment, the display 5 displays the properly expanded screen (in this embodiment, the optimum expanded screen that causes no distortion due to the difference between the image signal aspect ratio and the display aspect ratio without generating black zones at its top and bottom sides or its left and right sides in most cases) with simpler operation. In the case where the image display device has the fixed display 5, the image display device can determine the proper horizontal expansion ratio and vertical expansion ratio automatically by storing the display aspect ratio in a nonvolatile memory or the like.

While information on the image signal aspect ratio is extracted from the image stream by the analyzing circuit 1 and the display aspect ratio can be determined by the connected display 6, the contents aspect ratio varies depending on the input image data. The display aspect ratio and the image signal aspect ratio are virtually limited to a small number of kinds (i.e. 4:3 and 16:9). It is possible to limit the remaining contents aspect ratio to typical ones and store a table (small table) of the horizontal expansion ratio and the vertical expansion ratio corresponding to the actually used display aspect ratios and the image signal aspect ratios and the typical contents aspect ratios in the storage circuit 9. For example, the user may select arbitrary horizontal expansion ratio and vertical expansion from the limited small table. In this case, parameters of the three kinds of aspect ratios are useful information for the user to select the horizontal expansion ratio and the vertical expansion ratio. Accordingly, the user can select the proper expansion ratio that generates no black zones from the typical expansion ratios without calculating the proper horizontal expansion ratio and vertical expansion ratio while viewing the image signal output to the display 5.

Further, the selected contents aspect ratio (such as 1:1.85) or its common name (such as American vista) may be displayed on the screen. As a result, when the user knows the contents aspect ratio, in selecting arbitrary horizontal expansion ratio and vertical expansion ratio, the user can select the proper horizontal expansion ratio and vertical expansion ratio while checking whether or not the user's known contents aspect ratio corresponds to the selected contents aspect ratio, thereby to select the proper horizontal expansion ratio and vertical expansion ratio that generate no black zones more easily and accurately.

<<Sixth Embodiment>>

Figure 6:
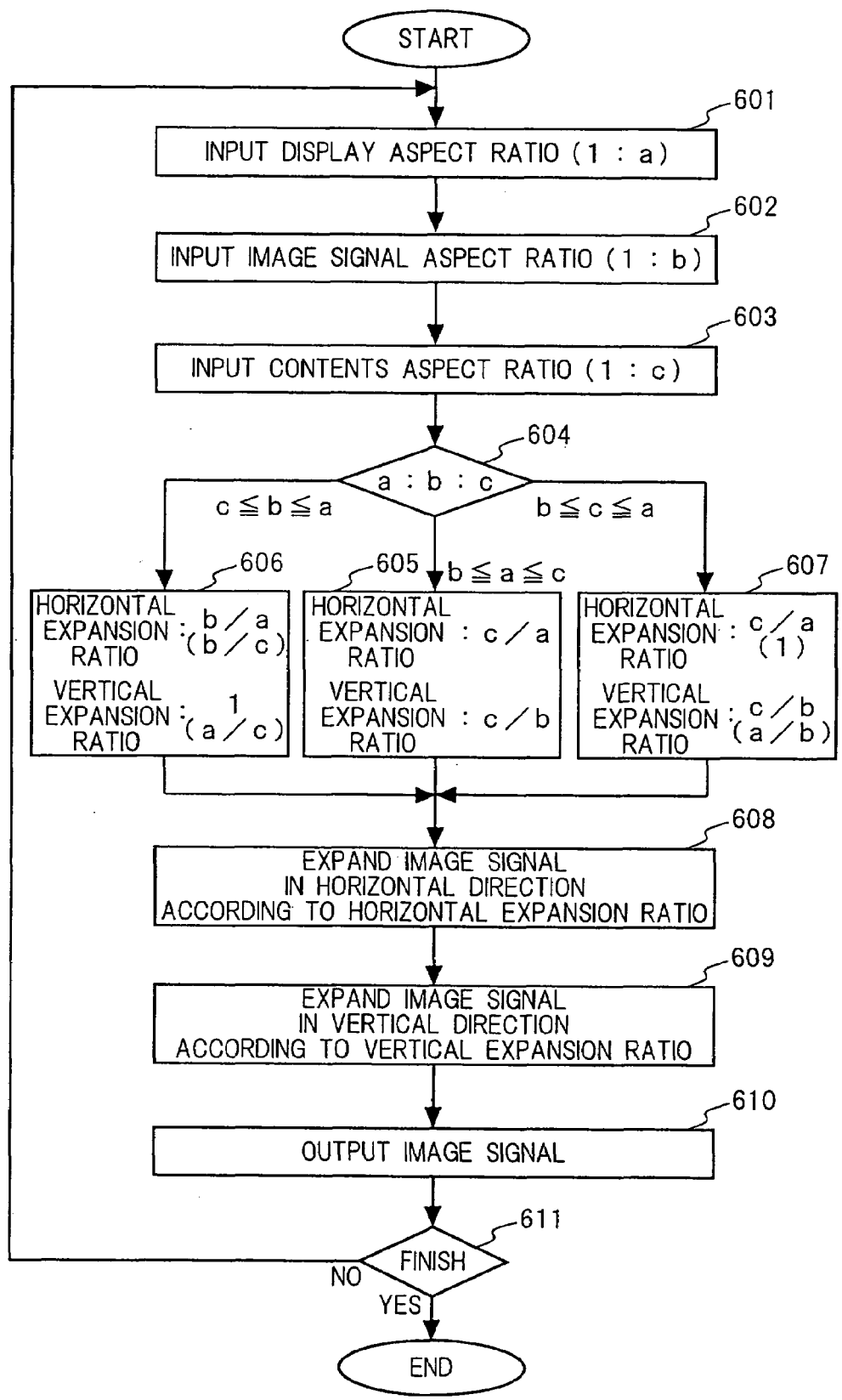
FIG. 6 is a flow chart of an image display method in accordance with a sixth embodiment of the present invention.

Referring to FIG. 6, an image display method in accordance with a sixth embodiment of the present invention will be described. The image display method in accordance with the sixth embodiment is performed by using the image display device in accordance with the third or fourth embodiment. FIG. 6 is a flow chart of the image display method in accordance with the sixth embodiment. In FIG. 6, firstly at a step 601, the arithmetic circuit 12 receives an input of the display aspect ratio (1:a). At a step 602, the analyzing circuit 1 extracts the image signal aspect ratio (1:b) from the image stream and the arithmetic circuit 12 receives an input of the image signal aspect ratio. At a step 603, the arithmetic circuit receives an input of the contents aspect ratio (1:c). The contents aspect ratio is input though the setting input circuit 8 by the user or estimated automatically by the black zone detecting circuit 11.

At a step 604, the arithmetic circuit 12 compares among a, b and c. The horizontal expansion ratio and the vertical expansion ratio are derived by using different functions depending on the comparison result. When it is determined to be $c \leq b \leq a$, the operation proceeds to a step 606. At the step 606, the arithmetic circuit 12 calculates b/a as the horizontal expansion ratio and 1 as the vertical expansion ratio and sets each value. Alternatively, the arithmetic circuit 12 calculates b/c as the horizontal expansion ratio and a/c as the vertical expansion ratio and sets each value. The operation proceeds to a step 608.

When it is determined to be b≦a≦c, the operation proceeds to a step 605. At the step 605, the arithmetic circuit 12 calculates c/a as the horizontal expansion ratio and c/b as the vertical expansion ratio and sets each value. The operation proceeds to a step 608.

When it is determined to be b≦c≦a, the operation proceeds to a step 607. At the step 607, the arithmetic circuit 12 calculates c/a as the horizontal expansion ratio and c/b as the vertical expansion ratio and sets each value. Alternatively, the arithmetic circuit 12 calculates 1 as the horizontal expansion ratio and a/b as the vertical expansion ratio and sets each value. The operation proceeds to a step 608.

At the step 608, the horizontal expanding circuit 3 expands the image signal in the horizontal direction according to the horizontal expansion ratio. At a step 609, the vertical expanding circuit 4 expands the image signal in the vertical direction according to the vertical expansion ratio. At a step 610, the display 5 output the image signal (displays the display screen of the image signal). At a step 611, when display is finished, the processing is finished. At a step 611, when display is not finished, the operation proceeds to the step 601 and the processing at the step 601 and subsequent steps is repeated.

Figure 7:
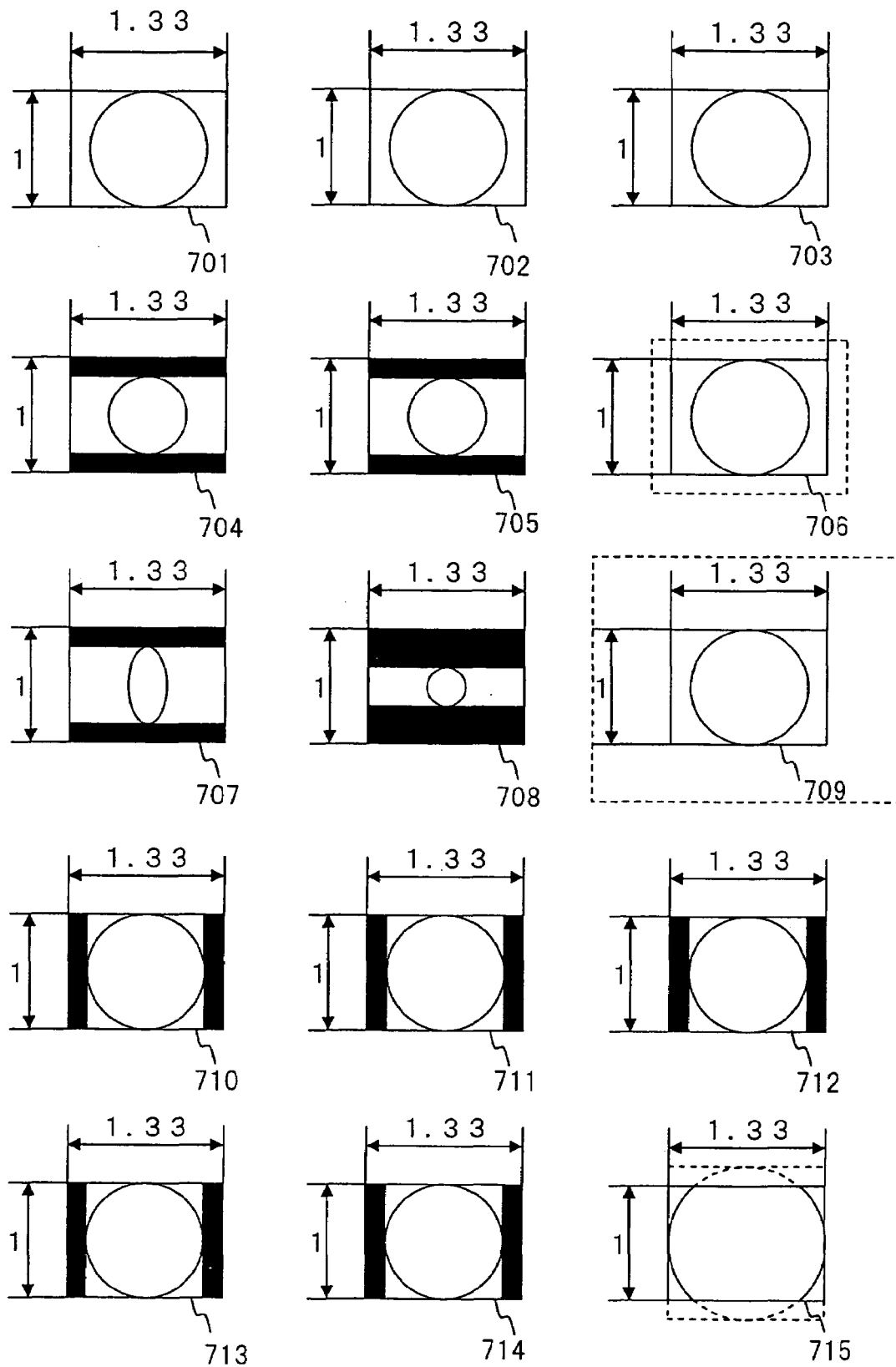
FIG. 7 is a view showing display screens of a display in combinations of display aspect ratio (1:1.33), image signal aspect ratio (1:1.33) and various contents aspect ratios.
Figure 8:
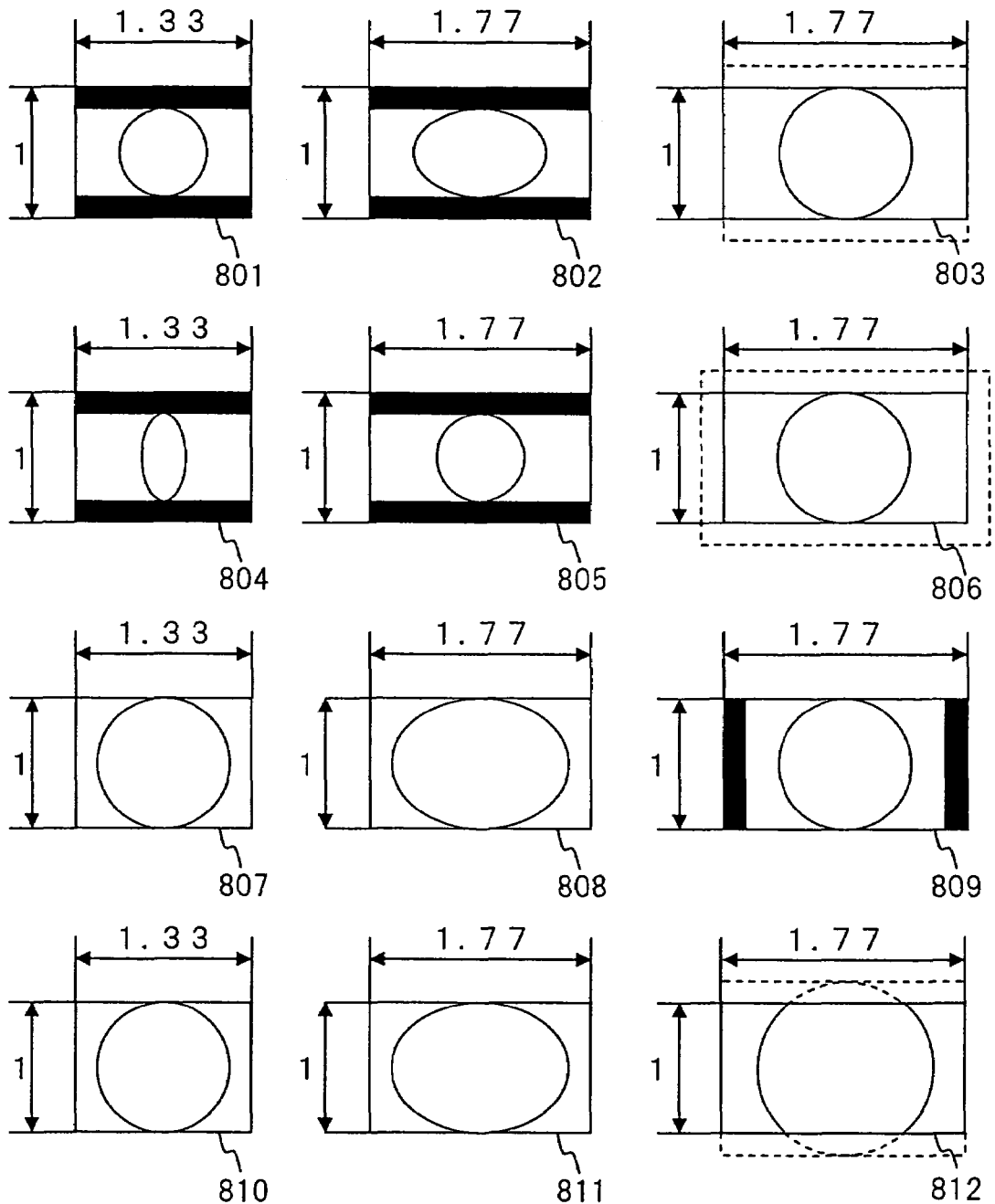
FIG. 8 is a view showing display screens of a display in combinations of display aspect ratio (1:1.77), image signal aspect ratio (1:1.77) and various contents aspect ratios.

FIGS. 7 to 9 are views illustrating screens displayed by the display of the image display devices in accordance with the conventional example and embodiments in the combinations of various aspect ratios of the display, image signal and contents. In FIG. 7, the reference numeral 701 indicates an image signal with aspect ratio of 1:1.33 (=3:4) containing contents with aspect ratio of 1:1.33 (=3:4). The reference numeral 702 indicates the display screen that the display with aspect ratio of 1:1.33 of the image display device in the conventional example displays the image signal 701.

The reference numeral 703 indicates the display screen that the display with aspect ratio of 1:1.33 of the image display device in accordance with the embodiments of the present invention displays the image signal 701. In this case, the relationship of a, b and c is a:b:c=1.33:1.33:1.33, that is, a=b=c. The operation proceeds from the step 604 to the step 605 (or the step 606 or 607) in FIG. 6. At the step 605, the arithmetic circuit 12 calculates c/a=1 as the horizontal expansion ratio and c/b=1 as the vertical expansion ratio and sets each value. At the step 608, the horizontal expanding circuit 3 expands the image signal in the horizontal direction according to the horizontal expansion ratio of 1. At a step 609, the vertical expanding circuit 4 expands the image signal in the vertical direction according to the vertical expansion ratio of 1. At the step 610, the display 5 outputs the image signal 701, resulting in 703.

The reference numeral 704 indicates an image signal with aspect ratio of 1:1.33 (=3:4) containing contents with aspect ratio of 1:1.77 (=9:16). The reference numeral 705 indicates the display screen that the display with aspect ratio of 1:1.33 of the image display device in the conventional example displays the image signal 704 according to the image signal aspect ratio.

The reference numeral 706 indicates the display screen that the display with aspect ratio of 1:1.33 of the image display device in accordance with the embodiments of the present invention displays the image signal 704. In this case, the relationship of a, b and c is a:b:c=1.33:1.33:1.77, that is, b=a<c, and accordingly the operation proceeds from the step 604 to the step 605 in FIG. 6. At the step 605, the arithmetic circuit 12 calculates c/a=1.33 as the horizontal expansion ratio and c/b=1.33 as the vertical expansion ratio and sets each value. At the step 608, the horizontal expanding circuit 3 expands the image signal in the horizontal direction according to the horizontal expansion ratio of 1.33. At a step 609, the vertical expanding circuit 4 expands the image signal in the vertical direction according to the vertical expansion ratio of 1.33. At the step 610, the display 5 outputs the image signal 704, resulting in 706. The image signal is expanded as shown by the broken line and only the part defined by the solid line is displayed on the display. In the image display device of the conventional example, the display displays the screen 705 with black zones at its top and bottom sides. In the image display device of the present invention, by expanding the screen at the step 608 and the step 609, the display 5 displays the screen 706 without with black zones at its top and bottom sides.

The reference numeral 707 indicates the image signal with aspect ratio of 1:1.33 (=3:4) containing horizontally squeezed contents with aspect ratio of 1:2.35 (cinema scope). The reference numeral 708 indicates the display screen that the display with aspect ratio of 1:1.33 of the image display device in the conventional example displays the image signal 707 fully at the contents aspect ratio of 1:2.35 accurately. The display displays the screen with expanded black zones at its top and bottom sides (that is, height of the effective section of the screen is decreased) by squeezing the screen in the vertical direction.

The reference numeral 709 indicates the display screen that the display with aspect ratio of 1:1.33 of the image display device in accordance with the embodiments of the present invention displays the image signal 707. In this case, the relationship of a, b and c is a:b:c=1.33:1.33:2.35, that is, b=a<c, and accordingly the operation proceeds from the step 604 to the step 605. At the step 605, the arithmetic circuit 12 calculates c/a=1.76 as the horizontal expansion ratio and c/b=1.76 as the vertical expansion ratio and sets each value. At the step 608, the horizontal expanding circuit 3 expands the image signal in the horizontal direction according to the horizontal expansion ratio of 1.76. At a step 609, the vertical expanding circuit 4 expands the image signal in the vertical direction according to the vertical expansion ratio of 1.76. At the step 610, the display 5 outputs the image signal, resulting in 709. The image signal is expanded as shown by the broken line and only the part defined by the solid line is displayed on the display. In the image display device of the conventional example, the display displays the screen 708 with black zones at its top and bottom sides. In the image display device of the present invention, by expanding the screen at the step 608 and the step 609, the display 5 displays the screen 709 without with black zones at its top and bottom sides. The reference numeral 710 indicates an image signal with aspect ratio of 1:1.33 (=3:4) containing contents with aspect ratio of 1:1. The reference numeral 711 indicates the display screen that the display with aspect ratio of 1:1.33 of the image display device in the conventional example displays the image signal 710 according to the image signal aspect ratio.

The reference numeral 712 indicates the display screen that the display with aspect ratio of 1:1.33 of the image display device in accordance with the embodiments of the present invention displays the image signal 710. In this case, the relationship of a, b and c is a:b:c=1.33:1.33:1, that is, c<b=a, and accordingly the operation proceeds from the step 604 to the step 606. At the step 606, the arithmetic circuit 12 calculates b/a=1 as the horizontal expansion ratio and 1 as the vertical expansion ratio and sets each value. At the step 608, the horizontal expanding circuit 3 expands the image signal in the horizontal direction according to the horizontal expansion ratio of 1. At a step 609, the vertical expanding circuit 4 expands the image signal in the vertical direction according to the vertical expansion ratio of 1. At the step 610, the display 5 outputs the image signal 710, resulting in 712.

The reference numeral 713 indicates an image signal with aspect ratio of 1:1.33 (=3:4) containing contents with aspect ratio of 1:1. The reference numeral 714 indicates the display screen that the display with aspect ratio of 1:1.33 of the image display device in the conventional example displays the image signal 713 according to the image signal aspect ratio.

The reference numeral 715 indicates the display screen that the display with aspect ratio of 1:1.33 of the image display device in accordance with the embodiments of the present invention displays the image signal 713. In this case, the relationship of a, b and c is a:b:c=1.33:1.33:1, that is, c<b=a, and accordingly the operation proceeds from the step 604 to the step 606. At the step 606, the arithmetic circuit 12 calculates b/c=1.33 as another horizontal expansion ratio in FIG. 6 and a/c=1.33 as another vertical expansion ratio in FIG. 6 and sets each value. At the step 608, the horizontal expanding circuit 3 expands the image signal in the horizontal direction according to the horizontal expansion ratio of 1.33. At the step 609, the vertical expanding circuit 4 expands the image signal in the vertical direction according to the vertical expansion ratio of 1.33. At the step 610, the display 5 outputs the image signal, resulting in 715. In the image display device of the conventional example, the display displays the screen 714 with black zones at its left and right sides. In the image display device of the present invention, by expanding the screen at the step 608 and the step 609, the display 5 displays the screen 715 without with black zones at its top and bottom sides.

In FIG. 8, the reference numeral 801 indicates an image signal with aspect ratio of 1:1.33 (=3:4) containing contents with aspect ratio of 1:1.77 (=9:16). The reference numeral 802 indicates the display screen that the display with aspect ratio of 1:1.77 (=9:16) of the image display device in the conventional example displays the image signal 801. The display screen 802 is expanded in the horizontal direction due to the difference between the image signal aspect ratio and the display aspect ratio.

The reference numeral 803 indicates the display screen that the display with aspect ratio of 1:1.77 (=9:16) of the image display device in accordance with the embodiments of the present invention displays the image signal 801. In this case, the relationship of a, b and c is a:b:c=1.77:1.33:1.77, that is, b<a=c, and accordingly the operation proceeds from the step 604 to the step 605. At the step 605, the arithmetic circuit 12 calculates c/a=1 as the horizontal expansion ratio and c/b=1.33 as the vertical expansion ratio and sets each value. At the step 608, the horizontal expanding circuit 3 expands the image signal in the horizontal direction according to the horizontal expansion ratio of 1. At the step 609, the vertical expanding circuit 4 expands the image signal in the vertical direction according to the vertical expansion ratio of 1.33. At the step 610, the display 5 outputs the image signal, resulting in 803. In the image display device of the conventional example, the display displays the screen 802 with black zones at its top and bottom sides. In the image display device of the present invention, by expanding the screen at the step 608 and the step 609, the display 5 displays the screen 803 without with black zones at its top and bottom sides.

The reference numeral 804 indicates the image signal with aspect ratio of 1:1.85 (American vista) containing horizontally squeezed contents with aspect ratio of 1:1.33 (=3:4). The reference numeral 805 indicates the display screen that the display with aspect ratio of 1:1.77 (=9:16) of the image display device in the conventional example displays the image signal 804 at the contents aspect ratio of 1:1.85 accurately.

The reference numeral 806 indicates the display screen that the display with aspect ratio of 1:1.77 (=9:16) of the image display device in accordance with the embodiments of the present invention displays the image signal 804. In this case, the relationship of a, b and c is a:b:c=1.77:1.33:1.85, that is, b<a<c, and accordingly the operation proceeds from the step 604 to the step 605. At the step 605, the arithmetic circuit 12 calculates c/a=1.05 as the horizontal expansion ratio and c/b=1.05 as the vertical expansion ratio and sets each value. At the step 608, the horizontal expanding circuit 3 expands the image signal in the horizontal direction according to the horizontal expansion ratio of 1.05. At the step 609, the vertical expanding circuit 4 expands the image signal in the vertical direction according to the vertical expansion ratio of 1.05. At the step 610, the display 5 outputs the image signal, resulting in 806. In the image display device of the conventional example, the display displays the screen 805 with black zones at its top and bottom sides. In the image display device of the present invention, by expanding the screen at the step 608 and the step 609, the display 5 displays the screen 806 without with black zones at its top and bottom sides.

The reference numeral 807 indicates an image signal with aspect ratio of 1:1.33 (=3:4) containing contents with aspect ratio of 1:1.33 (=3:4). The reference numeral 808 indicates the display screen that the display with aspect ratio of 1:1.77 (9:16) of the image display device in the conventional example displays the image signal 807 as it is (without converting the aspect ratio). The display screen 808 is expanded in the horizontal direction due to the difference between the image signal aspect ratio and the display aspect ratio.

The reference numeral 809 indicates the display screen that the display with aspect ratio of 1:1.77 (=9:16) of the image display device in accordance with the embodiments of the present invention displays the image signal 807. In this case, the relationship of a, b and c is a:b:c=1.77:1.33:1.33, that is, c=b<a, and accordingly the operation proceeds from the step 604 to the step 606. At the step 606, the arithmetic circuit 12 calculates b/a=0.75 as the horizontal expansion ratio and 1 as the vertical expansion ratio and sets each value. At the step 608, the horizontal expanding circuit 3 contracts the image signal in the horizontal direction according to the horizontal expansion ratio of 0.75 and adds the black zones at its left and right sides by the contracted length. At the step 609, the vertical expanding circuit 4 expands the image signal in the vertical direction according to the vertical expansion ratio of 1. At the step 610, the display 5 outputs the image signal, resulting in 809. In the image display device of the conventional example, the display displays the distorted screen 808. In the image display device of the present invention, by expanding (contracting) the screen at the step 608 and the step 609, the display 5 displays the screen 809 without distortion.

The reference numeral 810 indicates an image signal with aspect ratio of 1:1.33 (=3:4) containing contents with aspect ratio of 1:1.33 (=3:4). The reference numeral 811 indicates the display screen that the display with aspect ratio of 1:1.77 (=9:16) of the image display device in the conventional example displays the image signal 810 as it is (without converting the aspect ratio). The display screen 811 is expanded in the horizontal direction due to the difference between the image signal aspect ratio and the display aspect ratio.

The reference numeral 812 indicates the display screen that the display with aspect ratio of 1:1.77 (=9:16) of the image display device in accordance with the embodiments of the present invention displays the image signal 810. In this case, the relationship of a, b and c is a:b:c=1.77:1.33:1.33, that is, c=b<a, and accordingly the operation proceeds from the step 604 to the step 606. At the step 606, the arithmetic circuit 12 calculates c=1 as another horizontal expansion ratio in FIG. 6 and a/c=1.33 as another vertical expansion ratio in FIG. 6 and sets each value. At the step 608, the horizontal expanding circuit 3 expands the image signal in the horizontal direction according to the horizontal expansion ratio of 1. At the step 609, the vertical expanding circuit 4 expands the image signal in the vertical direction according to the vertical expansion ratio of 1.33. At the step 610, the display 5 outputs the image signal, resulting in 812. In the image display device of the conventional example, the display displays the distorted screen 811. In the image display device of the present invention, by expanding the screen at the step 608 and the step 609, the display 5 displays the screen 812 without distortion and black zones in spite of lacking part of contents at its top and bottom sides.

In FIG. 9, the reference numeral 913 indicates an image signal with aspect ratio of 1:1.33 (=3:4) containing contents with aspect ratio of 1:1. The reference numeral 914 indicates the display screen that the display with aspect ratio of 1:1.77 (=9:16) of the image display device in the conventional example displays the image signal 913 as it is (without converting the aspect ratio). The display screen 914 is expanded in the horizontal direction due to the difference between the image signal aspect ratio and the display aspect ratio.

The reference numeral 915 indicates the display screen that the display with aspect ratio of 1:1.77 (=9:16) of the image display device in accordance with the embodiments of the present invention displays the image signal 913. In this case, the relationship of a, b and c is a:b:c=1.77:1.33:1, that is, c<b<a, and accordingly the operation proceeds from the step 604 to the step 606. At the step 606, the arithmetic circuit 12 calculates b/a=0.75 as the horizontal expansion ratio and 1 as the vertical expansion ratio and sets each value. At the step 608, the horizontal expanding circuit 3 contracts the image signal in the horizontal direction according to the horizontal expansion ratio of 0.75 and adds black zones at its left and right sides by the contacted length. At the step 609, the vertical expanding circuit 4 expands the image signal in the vertical direction according to the vertical expansion ratio of 1. At the step 610, the display 5 outputs the image signal, resulting in 915. In the image display device of the conventional example, the display displays the distorted screen 914. In the image display device of the present invention, by expanding the screen at the step 608 and the step 609, the display 5 displays the screen 915 without distortion, but with black zones at its left and right sides.

The reference numeral 916 indicates an image signal with aspect ratio of 1:1.33 (=3:4) containing contents with aspect ratio of 1:1. The reference numeral 917 indicates the display screen that the display with aspect ratio of 1:1.77 (=9:16) of the image display device in the conventional example displays the image signal 916 as it is (without converting the aspect ratio). The display screen 917 is expanded in the horizontal direction due to the difference between the image signal aspect ratio and the display aspect ratio.

The reference numeral 918 indicates the display screen that the display with aspect ratio of 1:1.77 (=9:16) of the image display device in accordance with the embodiments of the present invention displays the image signal 916. In this case, the relationship of a, b and c is a:b:c=1.77:1.33:1, that is, c<b<a, and accordingly the operation proceeds from the step 604 to the step 606. At the step 606, the arithmetic circuit 12 calculates b/c=1.33 as another horizontal expansion ratio in FIG. 6 and a/c=1.77 as another vertical expansion ratio in FIG. 6 and sets each value. At the step 608, the horizontal expanding circuit 3 expands the image signal in the horizontal direction according to the horizontal expansion ratio of 1.33. At the step 609, the vertical expanding circuit 4 expands the image signal in the vertical direction according to the vertical expansion ratio of 1.77. At the step 610, the display 5 outputs the image signal, resulting in 918.

In the image display device of the conventional example, the display displays the distorted screen 917 with black zones at its left and right sides. In the image display device of the present invention, by expanding the screen at the step 608 and the step 609, the display 5 displays the screen 918 without distortion and black zones in spite of lacking part of contents at its top and bottom sides.

The reference numeral 919 indicates an image signal with aspect ratio of 1:1.33 (=3:4) containing contents with aspect ratio of 1:1.66 (European vista). The reference numeral 920 indicates the display screen that the display with aspect ratio of 1:1.77 (=9:16) of the image display device in the conventional example displays the image signal 919 as it is (without converting the aspect ratio). The display screen 920 is expanded in the horizontal direction due to the difference between the image signal aspect ratio and the display aspect ratio.

The reference numeral 920 indicates the display screen that the display with aspect ratio of 1:1.77 (=9:16) of the image display device in accordance with the embodiments of the present invention displays the image signal 919. In this case, the relationship of a, b and c is a:b:c=1.77:1.33:1.66, that is, b<c<a, and accordingly the operation proceeds from the step 604 to the step 607. At the step 607, the arithmetic circuit 12 calculates c/a=0.94 as the horizontal expansion ratio and c/b=1.25 as the vertical expansion ratio and sets each value. At the step 608, the horizontal expanding circuit 3 contracts the image signal in the horizontal direction according to the horizontal expansion ratio of 0.94 and adds black zones at its left and right sides by the contacted length. At the step 609, the vertical expanding circuit 4 expands the image signal in the vertical direction according to the vertical expansion ratio of 1.25. At the step 610, the display 5 outputs the image signal, resulting in 921.

In the image display device of the conventional example, the display displays the distorted screen 920. In the image display device of the present invention, by expanding the screen at the step 608 and the step 609, the display 5 displays the screen 921 with black zoned at its left and right sides, but without distortion.

The reference numeral 922 indicates an image signal with aspect ratio of 1:1.33 (=3:4) containing contents with aspect ratio of 1:1.66 (European vista). The reference numeral 923 indicates the display screen that the display with aspect ratio of 1:1.77 (=9:16) of the image display device in the conventional example displays the image signal 922 as it is (without converting the aspect ratio). The display screen 922 is expanded in the horizontal direction due to the difference between the image signal aspect ratio and the display aspect ratio.

The reference numeral 924 indicates the display screen that the display with aspect ratio of 1:1.77 (=9:16) of the image display device in accordance with the embodiments of the present invention displays the image signal 922. In this case, the relationship of a, b and c is a:b:c=1.77:1.33: 1.66, that is, b<c<a, and accordingly the operation proceeds from the step 604 to the step 607. At the step 606, the arithmetic circuit 12 calculates 1 as another horizontal expansion ratio in FIG. 6 and a/b=1.33 as another vertical expansion ratio in FIG. 6 and sets each value. At the step 608, the horizontal expanding circuit 3 expands the image signal in the horizontal direction according to the horizontal expansion ratio of 1. At the step 609, the vertical expanding circuit 4 expands the image signal in the vertical direction according to the vertical expansion ratio of 1.33. At the step 610, the display 5 outputs the image signal, resulting in 924.

In the image display device of the conventional example, the display displays the distorted screen 923. In the image display device of the present invention, by expanding the screen at the step 608 and the step 609, the display 5 displays the screen 924 without distortion and black zones in spite of lacking part of contents at its top and bottom sides.

As described above, based on information on each aspect ratio of the display, image signal and contents, the arithmetic circuit 12 in accordance with these embodiments obtains the horizontal expansion ratio and the vertical expansion ratio generating the display screen that does not cause black zones at its top and bottom sides or its left and right sides and distortion due to the difference between the image signal aspect ratio and the display aspect ratio substantially in most cases by calculation. In the case where the image signal contains squeezed contents, distortion of contents can be removed, for example, by expanding the image signal itself in the horizontal direction based on information on the squeeze. By preventing the distortion of image due to the difference between the image signal aspect ratio and the display aspect ratio from occurring, the image display device can substantially generate the display screen without distortion at any time.

In the image display device of the present invention, various combinations of the aspect ratios of the display, image signal and contents can be addressed flexibly so that the display displays a proper screen that causes no distortion due to the difference between the image signal aspect ratio and the display aspect ratio without generating black zones at its top and bottom sides or left and right sides in most cases.

When the display device has the black zone detecting circuit 11, the black zone detecting circuit 11 estimates the contents aspect ratio from the image signal output from the image decoding circuit 2 and the analyzing circuit 1 extracts the image signal aspect ratio from the image stream. In this case, only by setting the display aspect ratio from outside, the arithmetic circuit 12 can determine the optimum horizontal expansion ratio and vertical expansion ratio. In the image display device in accordance with this embodiment, the display 5 displays the properly expanded screen (the optimum expanded screen that causes no distortion due to the difference between the image signal aspect ratio and the display aspect ratio without generating black zones at its top and bottom sides or its left and right sides in most cases) with simpler operation. In the case where the image display device has the fixed display 5, the image display device can determine the proper horizontal expansion ratio and vertical expansion ratio automatically by storing the display aspect ratio in a nonvolatile memory or the like.

While information on the image signal aspect ratio is extracted from the image stream by the analyzing circuit 1 and the display aspect ratio can be determined by the connected display 6, the contents aspect ratio varies depending on the input image data. The display aspect ratio and the image signal aspect ratio are virtually limited to a small number of kinds (i.e. 4:3 and 16:9). It is possible to limit the remaining contents aspect ratio to typical ones and store a table (small table) of the horizontal expansion ratio and the vertical expansion ratio corresponding to the actually used display aspect ratios and the image signal aspect ratios and the typical contents aspect ratios in the storage circuit 9. For example, the user may select arbitrary horizontal expansion ratio and vertical expansion from the limited small table. In this case, parameters of the three kinds of aspect ratios are useful information for the user to select the horizontal expansion ratio and the vertical expansion ratio. Accordingly, the user can select the proper expansion ratio that generates no black zones from the typical expansion ratios without calculating the proper horizontal expansion ratio and vertical expansion ratio while viewing the image signal output to the display 5.

Further, the selected contents aspect ratio (such as 1:1.85) or its common name (such as American vista) may be displayed on the screen. As a result, when the user knows the contents aspect ratio, in selecting arbitrary horizontal expansion ratio and vertical expansion ratio, the user can make a selection while checking whether or not the user's known contents aspect ratio corresponds to the selected contents aspect ratio, thereby to select the proper horizontal expansion ratio and vertical expansion ratio that generate no black zones more easily and accurately.

According to the present invention, when the combination of the image signal and contents each having various aspect ratios is displayed on the display with various aspect ratios, an advantageous effect of realizing the image display device and image display method that generate a proper display screen with simple operation or automatically can be obtained.

According to the present invention, when the combination of the image signal and contents each having various aspect ratios is displayed on the display with various aspect ratios, an advantageous effect of realizing the image display device and image display method that cause no distortion due to the difference between the image signal aspect ratio and the display aspect ratio without generating black zones at the top and bottom sides or the left and right sides in most cases.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

INDUSTRIAL APPLICABILITY

The image display device and image display method of the present invention can apply to various image display devices that receive and display an image signal having a different aspect ratio from the display.

The invention claimed is:

1. An image display device comprising:
a display image expanding part for expanding a display image of an image signal in at least one direction of the horizontal direction and the vertical direction based on an expansion ratio;
a display for displaying the expanded display image of said image signal; and
a selecting part for automatically setting said expansion ratio of said display image expanding part in at least one direction of the horizontal direction and the vertical direction based on information on an aspect ratio of said display, information on an aspect ratio of the image signal, and information on an aspect ratio of contents as an effective section of said image signal.

2. An image display device comprising:
a display image horizontal expanding part for expanding a display image of an image signal in the horizontal direction according to a horizontal expansion ratio;
a display image vertical expanding part for expanding a display image of the image signal in the vertical direction according to a vertical expansion ratio;
a display for displaying the expanded display image of said image signal; and
a selecting part for automatically setting said horizontal expansion ratio and said vertical expansion ratio of said display image horizontal and vertical expanding parts based on information on an aspect ratio of said display, information on an aspect ratio of the image signal, and information on an aspect ratio of contents as an effective section of said image signal.

3. An image display device as stated in claim 1, wherein said selecting part has a table or function for deriving said expansion ratio using information on an aspect ratio of the display, information on an aspect ratio of the image signal, and information on an aspect ratio of contents as parameters and derives and sets said expansion ratio based on said table or function.

4. An image display device as stated in claim 1 further comprising a contents aspect ratio detecting part for detecting position and width of black zones of the display image at the top and bottom sides or left and right sides from said image signal, calculating a contents aspect ratio as an aspect ratio of the screen except for said black zones based on the position and width of said black zones, and outputting the calculated result to the selecting part.

5. An image display device as stated in claim 1, wherein provided that the vertical:horizontal aspect ratio of the display is 1:a, the vertical:horizontal aspect ratio of the image signal is 1:b, and the vertical:horizontal aspect ratio of the contents is 1:c, said selecting part
sets c/a as a horizontal expansion ratio and c/b as a vertical expansion ratio in the case of $b \leq a \leq c$,
sets b/a as a horizontal expansion ratio and 1 as a vertical expansion ratio, or sets b/c as a horizontal expansion ratio and a/c as a vertical expansion ratio in the case of $c \leq b \leq a$, and
sets c/a as a horizontal expansion ratio and c/b as a vertical expansion ratio, or sets 1 as a horizontal expansion ratio and a/b as a vertical expansion ratio in the case of $b \leq c \leq a$.

6. An image display method comprising:
a selecting step of automatically setting an expansion ratio of a display image of an image signal in at least one direction of the horizontal direction and the vertical direction based on information on an aspect ratio of a display, information on an aspect ratio of said image signal, and information on an aspect ratio of contents as an effective section of said image signal;
a display image expanding step of expanding the display image of said image signal in at least one direction of the horizontal direction and the vertical direction based on said expansion ratio; and
a displaying step of displaying the expanded display image of said image signal.

7. An image display method comprising:
a selecting step of automatically setting a horizontal expansion ratio and a vertical expansion ratio based on information on an aspect ratio of a display, information on an aspect ratio of an image signal, and information on an aspect ratio of contents as an effective section of said image signal;
a horizontal expanding step of expanding a display image of said image signal in the horizontal direction according to said horizontal expansion ratio;
a vertical expanding step of expanding the display image of said image signal in the vertical direction according to said vertical expansion ratio; and
a displaying step of displaying the expanded display image of said image signal.

8. An image display method as stated in claim 6, wherein in said selecting step, said expansion ratio is derived and set based on a table or function for deriving said expansion ratio using information on an aspect ratio of the display, information on an aspect ratio of the image signal, and information on an aspect ratio of contents as parameters.

9. An image display method as stated in claim 6 further comprising a contents aspect ratio detecting step of detecting position and width of black zones of the display image at the top and bottom sides or left and right sides from said image signal, calculating a contents aspect ratio as an aspect ratio of the display image except for said black zones based on the position and width of said black zones, and outputting the calculated result to the selecting part.

10. An image display method as stated in claim 6, herein provided that the vertical: horizontal aspect ratio of the display is 1:a, the vertical:horizontal aspect ratio of the image signal is 1:b, and the vertical:horizontal aspect ratio of the contents is 1:c, in said selecting step,
c/a and c/b are set as a horizontal expansion ratio and a vertical expansion ratio, respectively, in the case of $b \leq a \leq c$,
b/a and 1 are set as a horizontal expansion ratio and as a vertical expansion ratio, respectively, or b/c and a/c are set as a horizontal expansion ratio and a/c as a vertical expansion ratio, respectively, in the case of $c \leq b \leq a$, and
c/a and c/b are set as a horizontal expansion ratio and as a vertical expansion ratio, respectively, or 1 and a/b are set as a horizontal expansion ratio and as a vertical expansion ratio, respectively, in the case of $b \leq c \leq a$.

* * * * *